US012543241B2

(12) United States Patent
Koskinen et al.

(10) Patent No.: US 12,543,241 B2
(45) Date of Patent: Feb. 3, 2026

(54) CONTROL FOR NON-SDT DATA TRANSMISSION

(71) Applicant: NOKIA TECHNOLOGIES OY, Espoo (FI)

(72) Inventors: Jussi-Pekka Koskinen, Oulu (FI); Samuli Heikki Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/170,230

(22) Filed: Apr. 4, 2025

(65) Prior Publication Data
US 2025/0234421 A1 Jul. 17, 2025

Related U.S. Application Data

(63) Continuation of application No. 18/717,741, filed as application No. PCT/CN2021/136827 on Dec. 9, 2021.

(51) Int. Cl.
H04W 76/27 (2018.01)
(52) U.S. Cl.
CPC .................. H04W 76/27 (2018.02)
(58) Field of Classification Search
CPC ..................................... H04W 76/27
See application file for complete search history.

(56) References Cited

U.S. PATENT DOCUMENTS

| 10,524,297 B2 | 12/2019 | Jung et al. |
| 12,295,055 B2 | 5/2025 | Talebi et al. |
| 2016/0249155 A1 | 8/2016 | Anev et al. |
| 2019/0261453 A1 | 8/2019 | Jain et al. |
| 2019/0268831 A1 | 8/2019 | Lee et al. |
| 2021/0243810 A1 | 8/2021 | Turtinen et al. |
| 2022/0330372 A1 | 10/2022 | Turtinen et al. |

(Continued)

FOREIGN PATENT DOCUMENTS

| CN | 105706519 A | 6/2016 |
| CN | 108307443 A | 7/2018 |

(Continued)

OTHER PUBLICATIONS

3GPP; "Email Discussion [91E][36][Positioningscope] Discussion points at end Intermediate Round"; 3GPP TSG-RAN Meeting #91-e; RP-210817; Mar. 22-26, 2021; 3 slides.

(Continued)

Primary Examiner — Will W Lin
(74) Attorney, Agent, or Firm — ALSTON & BIRD LLP

(57) ABSTRACT

Embodiments of the present disclosure relate to devices, methods, apparatuses and computer-readable storage medium for controlling DCCH based non-Small Data Transmission (SDT) data arrival. In some example embodiments, a terminal device transmits an indication an availability of non-Small Data Transmission (SDT) data to a network device during a SDT procedure. The terminal device monitors for a response to the indication, and performs an action comprising in response to absence of the response to the indication of the non-SDT data. The action comprises: entering an idle or inactive state and/or initiating a connection setup or resume request to the network device.

12 Claims, 4 Drawing Sheets

(56) References Cited

U.S. PATENT DOCUMENTS

| | | | | |
|---|---|---|---|---|
| 2022/0361239 | A1* | 11/2022 | Xu | H04W 76/27 |
| 2023/0080733 | A1* | 3/2023 | Tao | H04W 76/27 |
| | | | | 370/328 |
| 2023/0284231 | A1 | 9/2023 | Lin et al. | |
| 2023/0397020 | A1 | 12/2023 | Miao et al. | |
| 2024/0073987 | A1 | 2/2024 | Kim et al. | |
| 2024/0163960 | A1 | 5/2024 | Wang et al. | |
| 2024/0251470 | A1 | 7/2024 | Sha et al. | |
| 2024/0313896 | A1* | 9/2024 | Zhang | H04L 1/1896 |

FOREIGN PATENT DOCUMENTS

| | | |
|---|---|---|
| CN | 112088567 A | 12/2020 |
| CN | 112585899 A | 3/2021 |
| EP | 4236424 A1 | 8/2023 |
| EP | 4335238 A1 | 3/2024 |
| JP | 2024-513212 A | 3/2024 |
| WO | 2020/256420 A1 | 12/2020 |
| WO | 2022/205185 A1 | 10/2022 |
| WO | 2022/236055 A1 | 11/2022 |

OTHER PUBLICATIONS

3GPP; "Reply LS on Small data transmission"; 3GPP TSG CT WG1 Meeting #131-e; C1-215152; Aug. 19-27, 2021; 2 pages.
Asustek; "Handling non-SDT data arrival during subsequent SDT"; 3GPP TSG-RAN WG2 Meeting #113 electronic; R2-2101750; Jan. 25-Feb. 5, 2021; 2 pages.
CATT; "Consideration on UP common aspects of SDT"; 3GPP TSG-RAN WG2 Meeting #115 electronic; R2-2108681; Aug. 9-27, 2021; 7 pages.
Extended European Search Report for European Application No. 21966757.3 dated Jan. 16, 2025, 9 pages.
Huawei et al; "Further clarifications on non-SDT arrival solutions"; 3GPP TSG-RAN WG2 Meeting #116; R2-2111509; Nov. 1-12, 2021; 7 pages.
Intel Corporation et al; "Comments to R2-2111509 for non-SDT data arrival"; 3GPP TSG RAN WG2 Meeting #116-e; R2-2111523; Nov. 1-12, 2021; 25 pages.
Intel Corporation et al; "DCCH-based indication of non-SDT data arrival"; 3GPP TSG RAN WG2 Meeting #116-e; R2-2109617; Nov. 1-12, 2021; 4 pages.
Intel Corporation; "Failure and successful handling for an SDT session"; 3GPP TSG RAN WG2 Meeting #114; R2-2104881; May 19-27, 2021; 16 pages.
Intel Corporation; "Report of email discussion [Post114-e][507][SData] Non-SDT data arrival handling"; 3GPP TSF RAN WG2 Meeting #115-e; R2-2107292; Aug. 16-27, 2021; 101 pages.
InterDigital, "Report for Rel-17 Small data and URLLC/IIoT and Rel-16 NR-U, Power Savings, and 2step RACH", 3GPP TSG-RAN WG2 Meeting #113 electronic, R2-2101954, (Jan. 25-Feb. 5, 2021), 25 pages.
InterDigital; "Report of [Post113-e][503][SDT] T319, cell reselection and re-establishment"; 3GPP RAN WG2 Meeting #113bis-e; R2-2103971; Apr. 12-20, 2021; 33 pages.
InterDigital; "SDT CP and configuration aspects"; 3GPP RAN WG2 Meeting #114e; R2-2106050; May 19-27, 2021; 4 pages.
International Search Report and Written Opinion for Patent Cooperation Treaty Application No. PCT/CN2021/136827 dated May 25, 2022, 9 pages.
LG Electronics Inc; "Consideration on switching to non-SDT procedure"; 3GPP TSG-RAN2#115-e; R2-2107866; Aug. 16-27, 2021; 3 pages.
LG Electronics Inc; "New timer for SDT failure detection"; 3GPP TSG-RAN2#113-e; R2-2101947; Jan. 25-Feb. 3, 2021; 2 pages.
Nokia et al., "RRC procedure for SDT", 3GPP TSG-RAN WG2 Meeting #115 Electronic, R2-2108262, (Aug. 16-27, 2021), 6 pages.
Notice of Reasons for Refusal for Japanese Application No. 2024-534259 dated Mar. 27, 2025, 6 pages.
Qualcomm Incorporated; "CP common aspects of SDT"; 3GPP TSG-RAN WG2 Meeting #115 electronic; R2-2107992; Aug. 16-27, 2021; 6 pages.
Qualcomm Incorporated; "Discussion on control plane common aspects of NR small data transmission"; 3GPP TSG-RAN WG2 Meeting #113 bis electronic; R2-2103431; Apr. 12-20, 2021; 7 pages.
ZTE Corporation et al; "Draft CR for introduction of DCCH solution for non-SDT data arrival"; 3GPP TSG-RAN WG2 Meeting #116e; R2-2109618; Nov. 1-12, 2021; 5 pages.
ZTE Corporation, "General and other control plane open issues for SDT (email: [Post 113-e][502])", 3GPP TSG-RAN2 Meeting #113-bis-3, R2-210xxxx, (Apr. 12-20, 2021), 21 pages.
ZTE Corporation; "Work Item on NR smalldata tranmissions in INACTIVE state"; 3GPP TSG RAN Meeting #86; RP-193252; Dec. 9-12, 2019; 4 pages.
ZTE Corporation; "Work Item on NR smalldata transmissions in INACTIVE state"; 3GPP TSG RAN Meeting #88e; RP-201305; Jun. 29-Jul. 3, 2020; 5 pages.
ZTE Corporation; "Work Item on NR smalldata transmissions in INACTIVE state"; 3GPP TSG RAN Meeting #91e; RP-210870; 2021; 5 pages.
Office Action for Chinese Application No. 202180104455.6 dated Aug. 15, 2025, 12 pages.
Office Action for Japanese Application No. 2024-534259 dated Aug. 25, 2025, 4 pages.
Non-Final Rejection Mailed on Oct. 1, 2025 for U.S. Appl. No. 18/717,741, 21 page(s).
Office Action for Chinese Application No. 202180104455.6 dated Nov. 18, 2025, 12 pages.

* cited by examiner

CONTROL FOR NON-SDT DATA TRANSMISSION

CROSS-REFERENCE TO RELATED APPLICATIONS

This application is a continuation of U.S. application Ser. No. 18/717,741, filed Jun. 7, 2024, which is a national phase entry of International Application No. PCT/CN2021/136827, filed Dec. 9, 2021, the entire contents of which are incorporated herein by reference.

TECHNICAL FIELD

Embodiments of the present disclosure generally relate to the field of telecommunication, and in particular, to a device, method, apparatus and computer-readable storage medium for controlling non-Small Data Transmission.

BACKGROUND

With development of communication technology, Small Data Transmission (SDT) has been introduced to avoid signaling overhead and delay due to transition from an inactive mode to a connected mode. In a SDT procedure, a terminal device in the inactive mode may transmit small data packets to a network device in an uplink channel without transitioning to the connected mode. In some situations, data may be available on a radio bearer that is not configured as allowed for SDT during the SDT procedure. Such data may be referred as non-SDT data. Conventionally, the non-SDT data cannot be transmitted to the network device in the configured resources for SDT.

SUMMARY

In general, example embodiments of the present disclosure provide a device, method, apparatus and computer-readable storage medium for controlling non-SDT data transmission.

In a first aspect, there is provided a terminal device. The terminal device comprises at least one processor and at least one memory including computer program code. The at least one memory and the computer program code configured to, with the at least one processor, cause the terminal device to transmit an indication of an availability of non-Small Data Transmission (SDT) data to a network device during a SDT procedure. The terminal device is further caused to monitor for a response to the indication, and perform an action in response to absence of the response to the indication. The action comprises entering an idle or inactive state and/or transmitting a connection setup or resume request to the network device.

In a second aspect, there is provided a method implemented in a terminal device. In the method, the terminal device transmits an indication of an availability of non-Small Data Transmission (SDT) data to a network device during a SDT procedure. The terminal device monitors for a response to the indication, and performs an action comprising in response to absence of the response to the indication. The action comprises: entering an idle or inactive state and/or initiating a connection setup or resume request to the network device.

In a third aspect, there is provided an apparatus comprising means for performing the method according to the second aspect.

In a fourth aspect, there is provided computer-readable storage medium having instructions stored thereon. The instructions, when executed on at least one processor, cause the least one processor to perform the method according to the second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
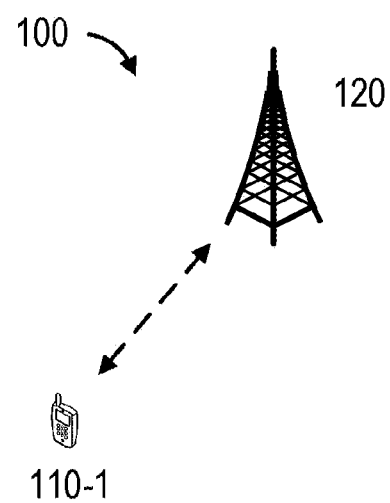
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the terms "network device" refers to a device which is capable of providing or hosting a cell or coverage where a further device, for example a terminal device, can communicate with. Examples of a network device include, but not limited to, a Node B (NodeB or NB), an Evolved NodeB (eNodeB or eNB), a next generation eNB (ng-eNB), a ng-eNB-Central Unit (ng-eNB-CU), a ng-eNB-Distributed Unit (ng-eNB-DU), a next generation NodeB (gNB), a gNB-Central Unit (gNB-CU), a gNB-Distributed Unit (gNB-DU), a Remote Radio Unit (RRU), a radio head (RH), a remote radio head (RRH), an Integrated Access and Backhaul (IAB) node, a low power node such as a femto node or a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, devices for Integrated Access and Backhaul (IAB), or image capture devices such as digital cameras, gaming devices, music storage and playback appliances, or Internet appliances enabling wireless or wired Internet access and browsing and the like. Herein, the term "terminal device" can be used interchangeably with a UE.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the singular forms "a", "an" and "the" are intended to include the plural forms as well, unless the context clearly indicates otherwise. The term 'includes' and its variants are to be read as open terms that mean "includes, but is not limited to. The term "based on" is to be read as "at least in part based on". The term "one embodiment" and 'an embodiment" are to be read as 'at least one embodiment". The term "another embodiment" is to be read as "at least one other embodiment". The terms "first", "second", and the like may refer to different or same objects.

As mentioned above, non-SDT data may become available to be transmitted from a terminal device to a network device while a SDT procedure is ongoing. Two approaches based on a Common Control Channel (CCCH) indication and a Dedicated Control Channel (DCCH) indication are considered for indication of availability of the non-SDT data to the network device by the terminal device. In CCCH based approach, upon the arrival of non-SDT data into a buffer of a radio bearer not configured as allowed for SDT, the terminal device terminates the SDT procedure and triggers a Radio Resource Control (RRC) resume or establishment procedure to setup a RRC connection to the network device. In the DCCH based approach, upon the arrival of non-SDT data into a buffer of a radio bearer not configured as allowed for SDT, the terminal device may transmit an indication of availability of the non-SDT data to the network device (for instance using an RRC message), while the SDT procedure is maintained. Once the indication of non-SDT data is received, the network device may instruct the terminal device to transition from the inactive mode to the connected mode for transmitting the non-SDT data. CCCH based approach is named as such based on the indication being transmitted over CCCH channel (over Signaling Radio Bearer 0 (SRB0)) by means of RRCResumeRequest. DCCH based approach is named as such based on the indication being transmitted over DCCH channel (over SRB1, SRB2 or SRB3) by means of a new or existing RRC message (like UEAssistanceInformation).

However, in some situations, for example, with poor radio conditions, the network device may not be able to receive or decode the indication of non-SDT data, or the terminal device cannot receive or decode the instructions transmitted by the network device in response to the indication. Further, the network device may fail to transmit the instruction due to other reasons, for example, resource congestion. As such, without the instruction from the network device, the terminal device may not enter the connected mode in time. For the non-SDT data with a higher priority, this may cause undesirable delay.

In addition, a SDT failure timer is defined for monitoring for a failure of SDT procedure. However, the SDT failure timer will be lengthy (for example, 10 seconds) since the time required for the SDT procedure cannot be assumed before the procedure. Furthermore, as the SDT data is generally not high priority, long delays in the failure determination is not an issue-unlike for the case of higher priority data arrival or emergency call. As such, the non-SDT data may also experience undesirable delay.

Example embodiments of the present disclosure provide a scheme for controlling non-SDT data transmission. In this scheme, if non-SDT data becomes available to be transmitted to a network device during a SDT procedure, the terminal device transmits an indication of the non-SDT data to the network device. Then, the terminal device monitors for a response to the indication from the network device. If the terminal device detects the response, such as a RRCResume message, the terminal device may transition from an inactive mode to a connected mode to transmit the non-SDT data to the network device. If the terminal device determines that there is no response from the network device, the terminal device terminates the SDT procedure and enters an inactive or idle mode and/or triggers transmission of a connection setup or a resume request to the network device. For example, the terminal device may transmit a RRCSetupRequest or a RRCResumeRequest to the network device to start or resume Radio Resource Control (RRC) connection with the network device in order to transmit the non-SDT data.

In this way, the transmission of the non-SDT data may be timely, and the transmission delay may be reduced.

FIG. 1 illustrates an example environment 100 in which example embodiments of the present disclosure can be implemented.

The environment 100, which may be a part of a communication network, comprises a terminal device 110 and a network device 120.

It is to be understood that the number of the terminal devices and the network device is shown in the environment 100 only for the purpose of illustration, without suggesting any limitation to the scope of the present disclosure. In some embodiments, the environment 100 may comprise a further terminal device and/or a further network device.

The terminal device 110 can communicate with the network device 120 or with a further terminal device (not shown) directly or via the network device 120. The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

The terminal device 110 may access a cell provided by the network device 120, and the terminal device 110 may transmit small data packets to the network device 120 during a SDT procedure when the terminal device 110 is in the inactive mode. In the SDT procedure, the data available on a radio bearer that is configured for SDT can be transmitted to the network device 120 in small data packets. However, the data available on a radio bearer that is not configured as allowed for SDT cannot be transmitted in the SDT procedure.

Figure 2:
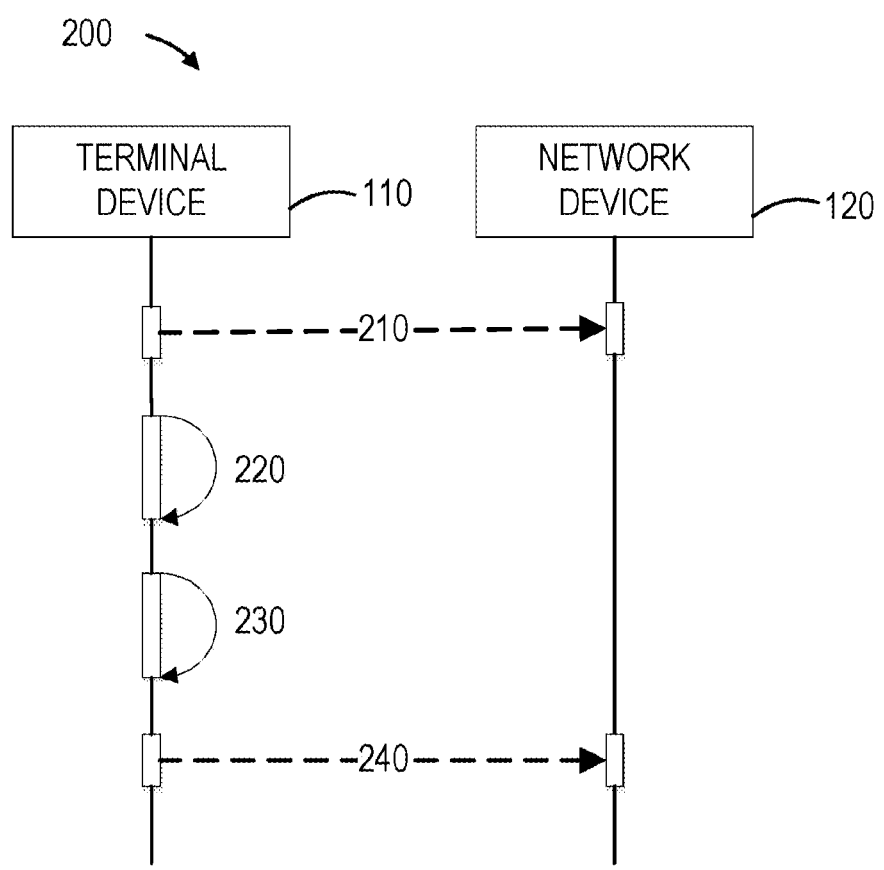
FIG. 2 illustrates a process for controlling non-SDT data transmission in accordance with some embodiments of the present disclosure.

FIG. 2 illustrates a process 200 for controlling non-SDT data transmission in accordance with some embodiments of the present disclosure. For purpose of discussion, the flowchart 200 will be described with reference to FIG. 1.

In the process 200, during a SDT procedure between the terminal device 110 and the network device 120, after non-SDT data becomes available to be transmitted to the network device 120, the terminal device 110 transmits (210) an indication of an availability of of the non-SDT data to the network device 120. The non-SDT data comprises data available on a radio bearer that is not configured (or unconfigured) as allowed for SDT. The terminal device 110 may transmit the indication of the non-SDT data to the network device 120 in any manner.

In some embodiments, the terminal device 110 may transmit the indication of the availability of the non-SDT data in a RRC message. In some embodiments, the terminal device 110 may transmit the indication in a Medium Access Control (MAC) signaling or a Physical Layer (PHY) signaling. In some embodiments, the terminal device 110 may transmit the indication in an existing message, for example, the terminal device 110 may transmit the indication of the non-SDT data in User Equipment (UE) assistance information.

In some embodiments, the terminal device 110 may reuse other existing signaling or messages to transmit the indication. In some embodiments, the terminal device 110 may transmit the indication of the non-SDT data in another uplink RRC message that may be defined for the purpose.

Then, the terminal device 110 monitors (220) for a response to the indication. For example, the network device 120 may transmit a response to the indication to the terminal device 110. In some embodiments, the response may comprise at least one of: a RRCResume message, a RRCSetup message, a RRCRelease message, a RRCRelease with suspendConfig message, or a RRCReject message. In some embodiments, the response may comprise any other message, signaling, or system information transmitted by the network device 120 for the indication of the non-SDT data. Based on the response received from the network device 120, the terminal device 110 may perform corresponding actions in order to transmit the non-SDT data to a network.

In some situations, such as with poor radio conditions, the terminal device 110 may not receive the response to the indication of the non-SDT data from the network device 120. In this case, the terminal device 110 may determine that the response to the indication of the non-SDT data is absent.

In some embodiments, the terminal device may adopt a timer for the monitoring of the response to determine the absence of the response to the indication of the non-SDT data. Upon the expiration of the timer for the monitoring, the terminal device 110 may determine the absence of the response to the indication of the non-SDT data.

In some embodiments, a timer dedicated for the transmission of the indication of the non-SDT data may be defined or configured.

In addition or alternatively, an existing timer may be reused as the timer for the monitoring. For example, the T319 timer may be reused as the timer for the monitoring. In some embodiments, as mentioned above, the terminal device 110 may transmit the indication of the non-SDT data in the UE assistant information, the UE assistant information prohibit timer, therefore, may be reused as the timer for the monitoring. In this case, upon the expiration of the UE assistance information prohibit timer, the terminal device 110 may determine the absence of the response to the indication of the non-SDT data. In some embodiments, any other existing timer may be reused as the timer for monitoring.

The timer for the monitoring may be started upon the transmission of the indication of the non-SDT data. Alternatively or in addition, the timer for the monitoring may be stopped upon a cell reselection initiated by the terminal device 110 or the reception of the response to the indication of the non-SDT data. In some embodiments, the response to the indication of the non-SDT data may comprise at least one of: a RRCResume message, a RRCSetup message, a RRCRelease message, a RRCRelease with suspendConfig message or a RRCReject message. In some embodiments, the response may comprise any other message, signaling, or system information transmitted by the network device 120 for the indication of the non-SDT data. In some embodiments, the response may comprise a RRCReject message which indicates the action for the terminal device 110. For example, the RRCReject message may indicate the terminal device 110 to go to idle or inactive mode; and/or indicate to initiate a connection setup or resume request to the network device 120. In some embodiments, if the terminal device 110 receives the RRCReject message, the terminal device 110 may maintain the SDT procedure. In some embodiments, if the terminal device 110 receives the RRCReject message, the terminal device 110 may terminate the SDT procedure.

In some embodiments, the SDT failure timer may also be reused as the timer for the monitoring. In some embodiments, the terminal device may determine the absence of the response to the indication of the non-SDT data upon the expiration of the SDT failure timer. In some embodiments, a timer dedicated for the transmission of the indication of the non-SDT data may also be defined or configured, the terminal device 110 may determine the absence of the response to the indication of the non-SDT data based on both the timer dedicated for the transmission of the indication of the non-SDT data and the SDT failure timer. For example, upon the expiration of any of these two timers, the terminal device 110 may determine the absence of the response to the indication of the non-SDT data. In some embodiments, the SDT failure timer may be stopped when the timer dedicated for the transmission of the indication of the non-SDT data is started or when the indication of the non-SDT data is transmitted. For example, in case the indication of the non-SDT data is transmitted quite close (for example, there are only a few milliseconds until the expiration of the SDT failure timer) to SDT failure timer expiry, stopping the SDT failure timer when the indication of the non-SDT data is transmitted or when the timer dedicated for the transmission of the indication of the non-SDT data is started allows sufficient time for the network device 120 to respond to the indication. Accordingly, stopping the SDT failure timer ensures the network to have time to respond to the non-SDT data in case the timer would have expired soon if not stopped.

In addition or alternatively to the timer for monitoring, the terminal device 110 may adopt other manners for determining the absence of the response to the indication of the non-SDT data. In some embodiments, the terminal device 110 may adopt a counter for counting the number of transmissions or retransmissions of the indication of the non-SDT data, in order to determine the absence of the response to the indication of the non-SDT data. In this case, a "max_amount_of_times" for the number of transmissions or retransmissions of the indication may be pre-determined. Upon the number of the transmissions or retransmissions of the indication reaching the "max_amount_of_times", the terminal device 110 may determine the absence of the response to the indication of the non-SDT data. In some embodiments, the transmission or retransmission of the indication is triggered based on a timer or non-Access Stratum (NAS). For example, the terminal device 110 may transmit the indication of the non-SDT data periodically based on the timer or transmit the indication based on an indication for the NAS. In some embodiments, the number of transmissions or retransmissions of the indication may be performed and maintained by the Radio Link Control (RLC) layer. For example, upon maximum number of RLC re-transmissions, the terminal device 110 may determine the absence of the response to the indication of the non-SDT data.

In some embodiments, different expiration times of the timer for monitoring and the "max_amount_of_times" for the counter may be pre-determined based on different services, Signalling or Data Radio Bearers (SRB or DRB), types of triggers, establishment causes, or may be dynamically changed on demand.

Once the terminal device 110 determines that the response to the indication of the non-SDT data is absent, the terminal device 110 performs (230) an action comprising: entering an idle or inactive state; and/or transmitting (240) a connection setup or resume request to the network device 120.

In some embodiments, the terminal device 110 may terminate the SDT procedure and enter the idle or inactive state. In some embodiments, the terminal device may initiate a connection setup or resume request to the network device 120 by transmitting the RRCSetupRequest or RRCResumeRequest.

As such, the transmission of the non-SDT data may be timely, and the transmission delay may be reduced.

Figure 3:
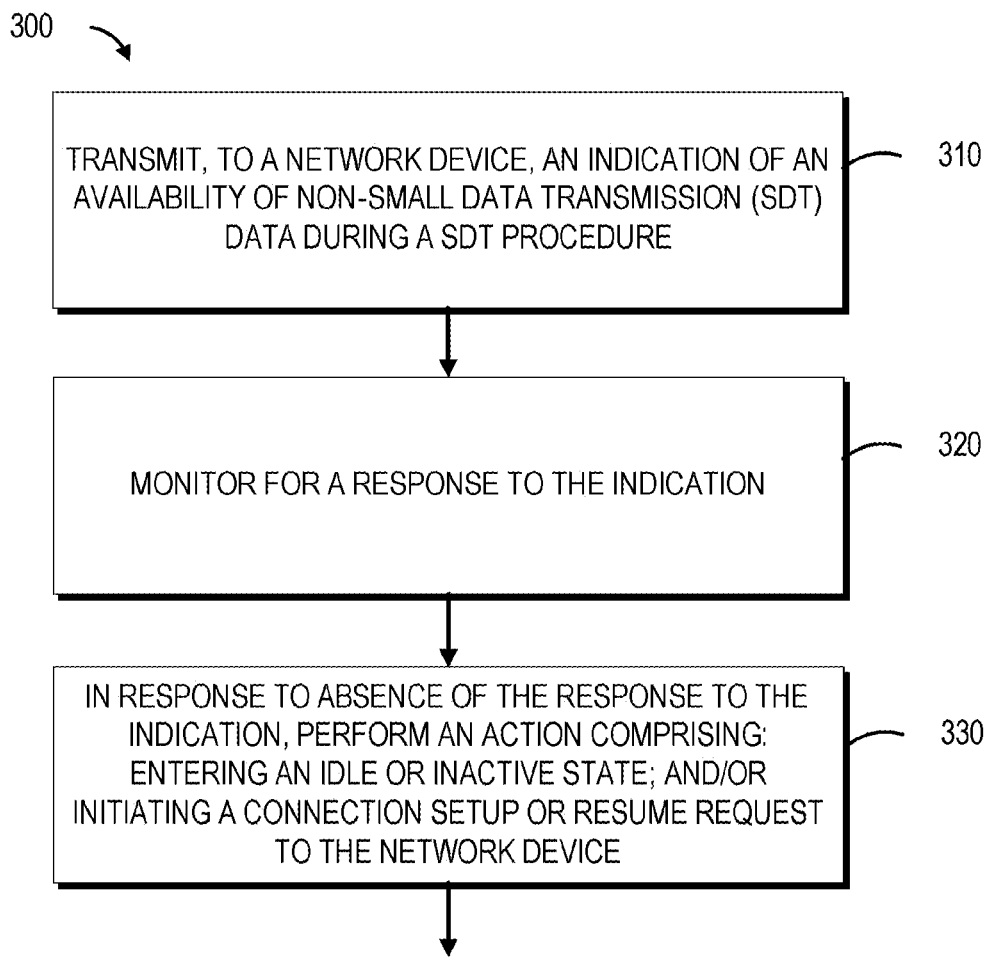
FIG. 3 illustrates a flowchart of an example process implemented at a terminal device in accordance with some embodiments of the present disclosure.

FIG. 3 illustrates a flowchart of an example method 300 implemented at a terminal device in accordance with some embodiments of the present disclosure.

The method 300 can be implemented at the terminal device 110 shown in FIG. 1. For the purpose of discussion, the method 300 will be described with reference to FIG. 1. It is to be understood that the method 300 may include additional acts not shown and/or may omit some shown acts, and the scope of the present disclosure is not limited in this regard.

At 310, the terminal device 110 transmits an indication of an availability of non-Small Data Transmission (SDT) data to a network device 120 during a SDT procedure.

At 320, the terminal device 110 monitors for a response to the indication.

At 330, the terminal device 110 performs an action in response to absence of the response to the indication, the action comprising: entering an idle or inactive state; and/or initiating a connection setup or resume request to the network device 120.

In some embodiments, the non-SDT data comprises data available on a radio bearer not configured as allowed for SDT.

In some embodiments, monitoring for the response to the indication comprises: monitoring for the response to the indication until expiration of a timer for the monitoring or a predetermined number of transmissions of the indication of the non-SDT data.

In some embodiments, the timer for the monitoring comprises at least one of: a SDT failure timer; a timer dedicated for the transmission of the indication of the non-SDT data; T319 timer; and a user equipment (UE) assistance information prohibit timer.

In some embodiments, the method 300 further comprises: retransmit the indication upon expiration of a timer; or retransmit the indication based on an indication from Non-Access Stratum (NAS).

In some embodiments, the timer for the monitoring is started upon the transmission of the indication; and/or the timer for the monitoring is stopped upon at least one of a cell reselection initiated by the terminal device or the reception of the response to the indication.

In some embodiments, the response comprises at least one of: a RRCResume message; a RRCSetup message; a RRCRelease mesage; a RRCReleasewith suspendConfig message; or a RRCReject message.

In some embodiments, the indication of the non-SDT data is transmitted in at least one of: a RRC message; MAC signaling; PHY signaling; and UE assistant information.

Figure 4:
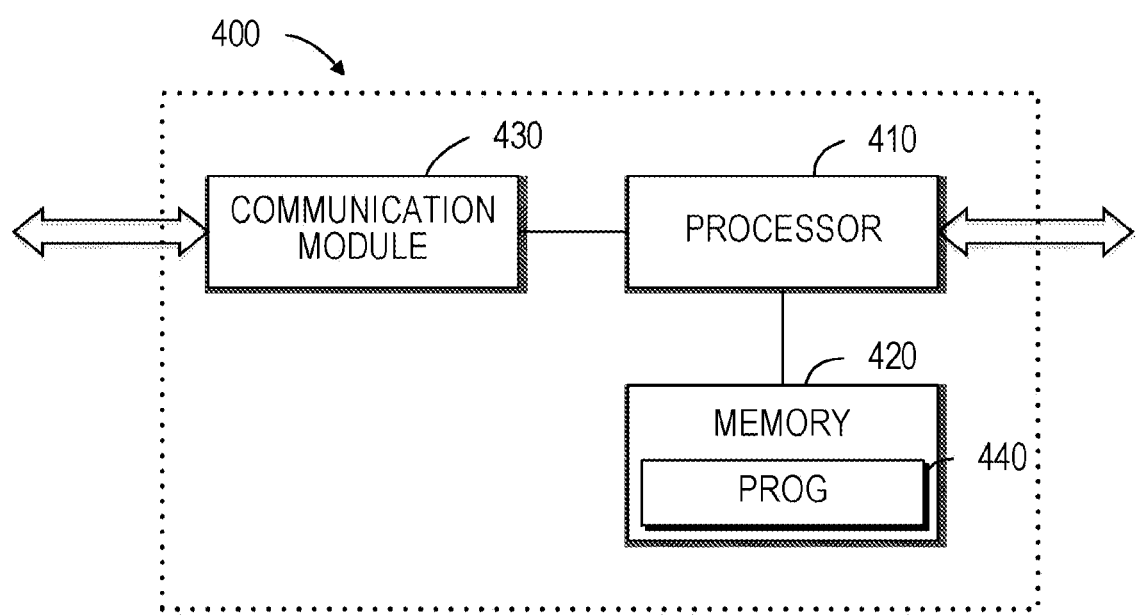
FIG. 4 is a simplified block diagram of a device that is suitable for implementing embodiments of the present disclosure.

FIG. 4 is a simplified block diagram of a device 400 that is suitable for implementing example embodiments of the present disclosure. The device 400 can be implemented at the terminal device 110 as shown in FIG. 1.

As shown, the device 400 includes a processor 410, a memory 420 coupled to the processor 410, a communication module 430 coupled to the processor 410, and a communication interface (not shown) coupled to the communication module 430. The memory 420 stores at least a program 440. The communication module 430 is for bidirectional communications, for example, via multiple antennas or via a cable. The communication interface may represent any interface that is necessary for communication.

The program 440 is assumed to include program instructions that, when executed by the associated processor 410, enable the device 400 to operate in accordance with the example embodiments of the present disclosure, as discussed herein with reference to FIGS. 1 to 2. The example embodiments herein may be implemented by computer software executable by the processor 410 of the device 400, or by hardware, or by a combination of software and hardware. The processor 410 may be configured to implement various example embodiments of the present disclosure.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 420 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

When the device 400 acts as the terminal device 110, the processor 410 may implement the operations or acts of the first device 110 as described above with reference to FIGS. 2 and 3. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the operations and acts as described above with reference to FIGS. 1 to 3. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions or operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a terminal device comprises at least one processor; and at least one memory including computer program code; and the at least one memory and the computer program code configured to, with the at least one processor, cause the terminal device to: transmit, to a network device, an indication of an availability of non-Small Data Transmission (SDT) data during a SDT procedure; monitor for a response for the indication; and in response to absence of the response for the indication, perform an action comprising: entering an idle or inactive state; and/or initiating a connection setup or resume request to the network device.

In some example embodiments, the non-SDT data comprises data available on a radio bearer not configured as allowed for SDT.

In some example embodiments, the terminal device is caused to monitor for the response to the indication by monitoring for the response to the indication until expiration of a timer for the monitoring or a predetermined number of transmissions of the indication of the non-SDT data.

In some example embodiments, the timer for the monitoring comprises at least one of: a SDT failure timer; a timer dedicated for the transmission of the indication of the non-SDT data; T319 timer; and a user equipment (UE) assistance information prohibit timer.

In some example embodiments, the terminal device is further caused to: retransmit the indication upon expiration of a timer; or retransmit the indication based on an indication from Non-Access Stratum (NAS).

In some example embodiments, the timer for the monitoring is started upon the transmission of the indication;

and/or the timer for the monitoring is stopped upon at least one of a cell reselection initiated by the terminal device or the reception of the response to the indication.

In some example embodiments, the response comprises at least one of: a RRCResume message; a RRCSetup message; a RRCRelease mesage; a RRCReleasewith suspendConfig message; or a RRCReject message.

In some example embodiments, the indication is transmitted in at least one of: a RRC message; MAC signaling; PHY signaling; and UE assistant information.

In some aspects, an apparatus implemented in a terminal device comprises: means transmitting, to a network device, an indication of an availability of non-Small Data Transmission (SDT) data during a SDT procedure; means for monitoring for a response for the indication; and means for, in response to absence of the response for the indication, performing an action comprising: entering an idle or inactive state; and/or initiating a connection setup or resume request to the network device.

In some example embodiments, the non-SDT data comprises data available on a radio bearer not configured as allowed for SDT.

In some example embodiments, means for monitoring for the response to the indication comprises: means for monitoring for the response to the indication until expiration of a timer for the monitoring or a predetermined number of transmissions of the indication of the non-SDT data.

In some example embodiments, the timer for the monitoring comprises at least one of: a SDT failure timer; a timer dedicated for the transmission of the indication of the non-SDT data; T319 timer; and a user equipment (UE) assistance information prohibit timer.

In some example embodiments, the apparatus further comprising: means for retransmitting the indication upon expiration of a timer; or means for retransmitting the indication based on an indication from Non-Access Stratum (NAS).

In some example embodiments, the timer for the monitoring is started upon the transmission of the indication; and/or the timer for the monitoring is stopped upon at least one of a cell reselection initiated by the terminal device or the reception of the response to the indication.

In some example embodiments, the response comprises at least one of: a RRCResume message; a RRCSetup message; a RRCRelease mesage; a RRCReleasewith suspendConfig message; or a RRCReject message.

In some example embodiments, the indication is transmitted in at least one of: a RRC message; MAC signaling; PHY signaling; and UE assistant information.

In some aspects, a computer-readable storage medium having instructions, when executed on at least one processor, cause the least one processor to perform the steps of the preceding aspects.

What is claimed is:

1. A terminal device comprising:
   at least one processor; and
   at least one memory including computer program code, wherein the at least one memory and the computer program code are configured to, with the at least one processor, cause the terminal device to perform at least:
   transmitting, to a network device, in user equipment (UE) assistance information, an indication of an availability of non-Small Data Transmission (SDT) data during a SDT procedure;
   monitoring for a response to the indication until expiration of a SDT failure timer following a predetermined duration of time elapsing; and
   in an instance in which the SDT failure timer expires following the predetermined duration of time elapsing without the terminal device receiving a response to the indication of the availability of the non-SDT data during the SDT procedure, performing one or more actions comprising:
   entering an idle state, and
   retransmitting the indication of the availability of non-SDT data.

2. The terminal device of claim 1, wherein the non-SDT data comprises data available on a radio bearer not configured as allowed for SDT.

3. The terminal device of claim 1, wherein the SDT failure timer for the monitoring is stopped upon at least one of: a cell reselection being initiated by the terminal device or the terminal device receiving a response to the indication of the availability of the non-SDT data during the SDT procedure.

4. The terminal device of claim 1, wherein the response to the indication of the availability of the non-SDT data during the SDT procedure comprises at least one of:
   an RRCResume message;
   an RRCSetup message;
   an RRCRelease message;
   an RRCReleasewithsuspendConfig message; or
   an RRCReject message.

5. A method implemented in a terminal device, the method comprising:
   transmitting, to a network device, in user equipment (UE) assistance information, an indication of an availability of non-Small Data Transmission (SDT) data during a SDT procedure;
   monitoring for a response to the indication until expiration of a SDT failure timer following a predetermined duration of time elapsing; and
   in an instance in which the SDT failure timer expires following the predetermined duration of time elapsing without the terminal device receiving a response to the indication of the availability of non-SDT data during the SDT procedure, performing one or more actions comprising:
   entering an idle state, and
   retransmitting the indication of the availability of non-SDT data.

6. The method of claim 5, wherein the non-SDT data comprises data available on a radio bearer not configured as allowed for SDT.

7. The method of claim 5, wherein the SDT failure timer for the monitoring is stopped upon at least one of: a cell reselection being initiated by the terminal device or the terminal device receiving a response to the indication of the availability of non-SDT data during the SDT procedure.

8. The method of claim 5, wherein the response to the indication of the availability of non-SDT data during the SDT procedure comprises at least one of:
   an RRCResume message;
   an RRCSetup message;
   an RRCRelease message;
   an RRCReleasewithsuspendConfig message; or
   an RRCReject message.

9. A non-transitory computer-readable storage medium having instructions stored thereon that, when executed by at least one processor, cause the at least one processor to perform at least:
   transmitting, to a network device, in user equipment (UE) assistance information, an indication of an availability of non-Small Data Transmission (SDT) data during a SDT procedure;

monitoring for a response to the indication until expiration of a SDT failure timer following a predetermined duration of time elapsing; and in an instance in which the SDT failure timer expires following the predetermined duration of time elapsing without the terminal device receiving a response to the indication of the availability of the non-SDT data during the SDT procedure, performing one or more actions comprising:

entering an idle state, and retransmitting the indication of the availability of non-SDT data.

10. The non-transitory computer-readable storage medium of claim 9, wherein the non-SDT data comprises data available on a radio bearer not configured as allowed for SDT.

11. The non-transitory computer-readable storage medium of claim 9, wherein the SDT failure timer for the monitoring is stopped upon at least one of: a cell reselection being initiated by the terminal device or the terminal device receiving a response to the indication of the availability of the non-SDT data during the SDT procedure.

12. The non-transitory computer-readable storage medium of claim 9, wherein the response to the indication of the availability of the non-SDT data during the SDT procedure comprises at least one of:

an RRCResume message;
an RRCSetup message;
an RRCRelease message;
an RRCReleasewithsuspendConfig message; or
an RRCReject message.

* * * * *